(12) United States Patent
Frantz et al.

(10) Patent No.: US 12,092,029 B2
(45) Date of Patent: Sep. 17, 2024

(54) FAN MODULE EQUIPPED WITH AN OIL TRANSFER DEVICE

(71) Applicant: SAFRAN AIRCRAFT ENGINES, Paris (FR)

(72) Inventors: Caroline Marie Frantz, Moissy-Cramayel (FR); Gilles Alain Marie Charier, Moissy-Cramayel (FR); Antoine Pierre Albert Mariot, Moissy-Cramayel (FR); Serge René Morreale, Moissy-Cramayel (FR); Sébastien Oriol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/549,681

(22) PCT Filed: Mar. 9, 2022

(86) PCT No.: PCT/FR2022/050426
§ 371 (c)(1),
(2) Date: Sep. 8, 2023

(87) PCT Pub. No.: WO2022/195199
PCT Pub. Date: Sep. 22, 2022

(65) Prior Publication Data
US 2024/0167421 A1    May 23, 2024

(30) Foreign Application Priority Data
Mar. 16, 2021 (FR) ...................................... 2102621

(51) Int. Cl.
*F02C 9/58* (2006.01)
*F01D 25/18* (2006.01)
(Continued)

(52) U.S. Cl.
CPC ................ *F02C 7/06* (2013.01); *F01D 25/18* (2013.01); *F02C 9/58* (2013.01); *F16H 57/0486* (2013.01); *F05D 2220/36* (2013.01)

(58) Field of Classification Search
CPC ...... F02C 7/06; F02C 9/58; F02K 1/66; F01D 25/18
See application file for complete search history.

(56) References Cited

U.S. PATENT DOCUMENTS

| | | | |
|---|---|---|---|
| 2004/0037483 A1 | 2/2004 | Beauvais et al. | |
| 2011/0286842 A1* | 11/2011 | Danielson | B64C 11/306 416/1 |
| 2024/0011404 A1* | 1/2024 | Oriol | B64C 11/385 |

FOREIGN PATENT DOCUMENTS

| | | |
|---|---|---|
| EP | 3 138 771 A1 | 3/2017 |
| EP | 3 179 044 A1 | 6/2017 |

(Continued)

OTHER PUBLICATIONS

International Search Report mailed Apr. 29, 2022, issued in corresponding International Application No. PCT/FR2022/050426, filed Mar. 9, 2022, 7 pages.

(Continued)

*Primary Examiner* — Gerald L Sung
(74) *Attorney, Agent, or Firm* — CHRISTENSEN O'CONNOR JOHNSON KINDNESS PLLC

(57) ABSTRACT

A fan module for an aircraft turbine engine includes a fan with a fan shaft and variable-pitch fan blades. The fan module further includes an oil transfer device transfers oil between a stator and an actuator that controls the pitch of the fan blades the device includes a stator ring having an inner cylindrical surface and internal oil ducts, each of which opens onto the inner cylindrical surface. A shaft is engaged in the stator ring and rotates about an axis inside the ring. The shaft includes an outer cylindrical surface extending (Continued)

inside said inner cylindrical surface. The shaft has internal oil ducts, each of which opens onto said outer cylindrical surface A rolling bearing is mounted between the ring and the shaft, on each side of the plain bearing.

11 Claims, 6 Drawing Sheets

(51) Int. Cl.
  *F02C 7/06* (2006.01)
  *F16H 57/04* (2010.01)

(56) References Cited

FOREIGN PATENT DOCUMENTS

| | | |
|---|---|---|
| GB | 824332 A | 11/1959 |
| WO | 2013/011225 A2 | 1/2013 |
| WO | 2015/102779 A1 | 7/2015 |

OTHER PUBLICATIONS

Written Opinion mailed Apr. 29, 2022, issued in corresponding International Application No. PCT/FR2022/050426, filed Mar. 9, 2022, 4 pages.

* cited by examiner

FAN MODULE EQUIPPED WITH AN OIL TRANSFER DEVICE

FIELD OF THE DISCLOSURE

The disclosure relates to a fan module for an aircraft turbine engine, this module comprising an oil transfer device.

BACKGROUND

The technical background comprises in particular the documents EP-A1-3 179 044, US-A1-2004/037483, EP-A1-3 138 771, WO-A2-2013/011225 and WO-A1-2015/102779.

An aircraft turbine engine typically comprises a gas generator comprising, from upstream to downstream in the flowing orientation of the operating gases, at least one compressor, an annular combustion chamber and at least one turbine.

The gases entering the gas generator are compressed in the compressor or the compressors, then mixed with fuel and burnt in the combustion chamber. The combustion gases flow and expand in the turbine or the turbines to drive its rotor or their rotors.

In the case of a turbine engine with double body, one low-pressure and one high-pressure, the rotor of the high-pressure turbine is connected by a high-pressure shaft to the rotor of the high-pressure compressor, and the rotor of the low-pressure turbine is connected by a low-pressure shaft to the rotor of the low-pressure compressor.

The turbine engine can be equipped with one or more shrouded or non-shrouded propellers. In the case of a shrouded propeller located upstream of the gas generator, this propeller is referred to as fan and is driven by the low-pressure shaft of the gas generator.

The fan generates a flow of gas during operation which is divided into a first flow, referred to as the primary flow, which flows into the gas generator as described above, and a second flow, referred to as the secondary flow, which flows around the gas generator.

The bypass ratio, which is the ratio of the secondary flow rate to the primary flow rate, is increasingly important in the modern turbine engine, resulting in an increase in the diameter of the fan and a reduction in the diameter of the gas generator.

To limit the speed of rotation of the fan, particularly in the turbine engines with a high bypass ratio, it is known to drive this fan by means of a reducer, generally of the epicyclic or planetary gear train type. The low-pressure shaft then drives the fan by means of the reducer.

A fan, or a propeller in general, may comprise variable pitch blades, i.e. each of the blades has an orientation about a radial axis that can be precisely adjusted. The blades are carried by a polygonal annulus-shaped hub and are displaced in rotation about these axes by means of a common hydraulic actuator mounted inside the hub. This actuator is supplied with oil and can be located in a rotating reference frame when it is secured in rotation to the hub and to the fan.

The turbine engine comprises a lubrication system comprising an oil reservoir and a pump, which is generally located in a stationary reference frame. It is therefore understood that the actuator must be supplied with oil from the lubrication system via an oil transfer device from a stationary reference frame to a rotating reference frame. A device of this type is commonly referred to as an OTB, an acronym for Oil Transfer Bearing.

This type of device can be mounted in a turbine engine with a fan of the type mentioned above to supply the actuator with oil and also to supply the reducer with lubricating oil. This type of device can also be mounted in another type of turbine engine, such as a turbine engine equipped with a non-shrouded propeller with variable pitch blades, of the turboprop type.

In the present technique, an oil transfer device comprises a stator annulus which comprises an internal cylindrical surface and internal oil pipes which each open onto this internal cylindrical surface. These pipes are connected by conduits to the above-mentioned lubrication system.

The device also comprises a shaft engaged in the annulus and movable in rotation about an axis inside this annulus. The shaft comprises an external cylindrical surface extending inside the internal cylindrical surface of the annulus, and internal oil pipes which each open onto this external cylindrical surface. These pipes are connected to the actuator by conduits to supply it with oil.

In the current technique, the external cylindrical surface of the shaft comprises annular grooves for housing annular sealing segments. These segments are able to displace in the grooves and are configured to rest radially on the internal surface of the annulus to limit and control oil leaks. The outlets of the above-mentioned pipes are located between two adjacent segments, thus ensuring that as much oil as possible from each pipe in the annulus is supplied to a corresponding pipe on the shaft. The number of segments is equal to twice the number of pipes. The document GB-A-824,332 describes an oil transfer device of this type.

However, this technology is unsatisfactory for a number of reasons. The manufacturing and assembly tolerances of the parts make it difficult to control these leaks precisely. The device comprises many parts, which makes the assembly more complex. The manufacture and the assembly of such a device is therefore relatively long and costly. In addition, the greater the number of pipes in the device and the greater the number of sealing segments, the greater the axial dimension and therefore the axial overall dimension of the device for mounting these different segments. An oil transfer device can be complex to integrate into a turbine engine because of its overall dimension. Finally, the service life of such a device is generally limited due to potential misalignments between the shaft and the annulus during operation and wear on the sealing segments, which can be accentuated by these misalignments as well as by the speed of rotation of the shaft. The larger the diameter of the device, the greater the peripheral speed of the shaft and the greater the wear on the segments.

The disclosure thus proposes an improved oil transfer device which solves all or some of the problems of the prior technique.

SUMMARY

The disclosure relates to a fan module for an aircraft turbine engine, this module comprising a fan which comprises a fan shaft and variable pitch fan vanes, and an oil transfer device which is configured to ensure a transfer of oil between a stator and an actuator which is secured in rotation to the fan shaft and which is configured to control the pitch of the fan vanes, this device comprising:
  a stator annulus comprising an internal cylindrical surface and internal oil pipes each opening onto the internal cylindrical surface,
  a shaft engaged in the stator annulus and movable in rotation about an axis inside the annulus, the shaft comprising an external cylindrical surface extending within the internal cylindrical surface, the shaft comprising internal oil pipes each opening to the external cylindrical surface, characterised in that the surfaces define between them an annular space which has a radial thickness of between 10 and 30 µm for the formation of a plain bearing, this plain bearing extending over the entire axial extent of these surfaces and being devoid of sealing members, and in that a rolling bearing is mounted between the annulus and the shaft on either side of the plain bearing, each rolling bearing comprising two rings between which rolling elements are located, each rolling bearing being mounted clamped in the radial direction between the annulus and the shaft.

The disclosure thus proposes an oil transfer device with no sealing members or segments between the cylindrical surfaces facing the annulus of the stator and of the shaft. These surfaces define a plain bearing with a precisely controlled radial thickness. Rolling bearings are mounted on either side of this plain bearing and are mounted clamped in such a way as to guarantee the radial thickness of the plain bearing, whatever the speed of the turbine engine and the peripheral speed of the shaft of the transfer device.

As used in this application, "clamped mounted" means, on the one hand, that there is no clearance between the parts during operation and, on the other hand, that there is negative clearance between the parts before mounting. The clamped mounting of the bearings between the annulus and the shaft can result from the clamped mounting of the rings between the annulus and the shaft, and/or the clamped mounting of the rolling elements between the rings. The internal ring of each bearing can thus be clamped mounted onto the shaft and the external ring of each bearing can thus be clamped mounted into the annulus. The rolling elements can also be clamped mounted between the rings of each bearing. The rolling bearings are therefore mounted with a radial preload between the annulus and the shaft. The rolling bearings are automatically lubricated by the oil that leaks from the plain bearing during operation. The rolling bearings also ensure the limitation of the oil leakage outside the plain bearing and the device. The rolling bearings also allow to eliminate the risk of misalignment between the annulus and the shaft, and therefore the risk of contact between them and wear. The sealing segments are therefore no longer wear parts of the device, which therefore has an optimised service life compared to the prior technology.

The module according to the disclosure may comprise one or more of the following characteristics, taken alone or in combination with each other:
- the rolling bearings are with rollers,
- the shaft and the annulus each comprise at least three or four pipes aligned one behind the other along the axis,
- each of the pipes opens into an annular gorge located on the internal or external surface,
- the orifices or the gorges are located at an axial distance from each other of between 15 and 35 mm,
- a shrink ring is mounted inside the annulus and defines the internal surface,
- the rolling bearings have identical mean diameters; in this application, mean diameter means the mean between a maximum external diameter and a minimum internal diameter of a part or an assembly of parts,
- the rolling bearings have average diameters greater than the diameter of the plain bearing,
- the rings of the rolling bearings have identical internal diameters,
- the fan is driven in rotation by a reducer, the device being mounted downstream of the reducer and being configured to supply oil to the reducer and to the actuator via conduits passing through the reducer,
- the reducer is of the epicyclic type, i.e. with a planet carrier movable in rotation and therefore with a ring gear that cannot rotate,
- the device supplies the reducer with lubricating oil, and in particular to at least some of its bearings and toothing,
- the conduits pass through a planet carrier in the reducer,
- the device is mounted around an input shaft of the reducer,
- the input shaft of the reducer has a diameter of between 30 mm and 200 mm, more particularly less than 150 mm and/or greater than 100 m,
- the input shaft of the reducer is configured to rotate at a peripheral speed of between 1 and 20 m/s, and preferably between 7 and 15 m/s,
- the device is configured to supply the actuator with an oil pressure of between 2 and 200 bar, and preferably between 5 and 130 bar,
- the device is configured to supply the reducer with an oil pressure of between 2 and 50 bar, and preferably between 5 and 20 bar,
- the shaft of the device is secured in rotation to the planet carrier of the reducer,
- the annulus of the device is attached to a stator of the turbine engine by an annular support having a certain flexibility in operation, this flexibility being obtained by means of through orifices and/or a particular shape in axial cross-section of this support.

The disclosure also relates to an aircraft turbine engine, comprising a module as described above.

The disclosure also relates to a method for assembling a module as described above, comprising the steps of:
a) mounting the annulus on the shaft of the device,
b) attaching the shaft of the device to a planet carrier of the reducer, and
c) displacing in translation the reducer and the device towards the stator.

DESCRIPTION OF THE DRAWINGS

Further characteristics and advantages will be apparent from the following description of a non-limiting embodiment of the disclosure with reference to the appended drawings in which.

DETAILED DESCRIPTION

Figure 1:
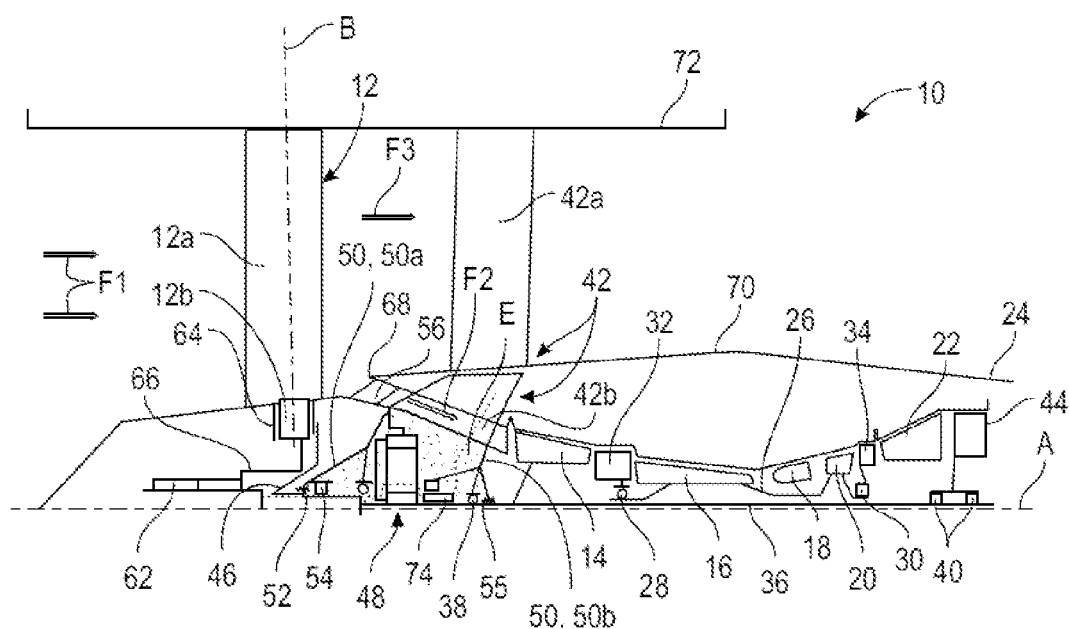
FIG. 1 is a schematic half-view in axial cross-section of a turbine engine equipped with an oil transfer device.

FIG. 1 shows a turbine engine 10 which typically comprises a fan 12, a low-pressure (LP) compressor 14, a high-pressure (HP) compressor 16, an annular combustion chamber 18, a high-pressure (HP) turbine 20, a low-pressure (LP) turbine 22 and an exhaust nozzle 24.

The rotors of the high-pressure compressor 16 and of the high-pressure turbine 20 are connected by a high-pressure shaft 26 and together form a high-pressure (HP) body, which is guided in rotation about the longitudinal axis A of the turbine engine by rolling bearings 28, 30. A first bearing 28 is mounted between an upstream end of the shaft 26 and of the HP body and an inter-compressor casing 32 located between the compressors LP 14 and HP 16. A second bearing 30 is mounted between a downstream end of the shaft 26 and of the HP body and an inter-turbine casing 34 located between the LP 22 and HP 20 turbines.

The rotors of the LP compressor 14 and of the LP turbine 22 are connected by a low-pressure shaft 36 and together form a low-pressure (LP) body which is guided in rotation about the longitudinal axis A of the turbine engine by rolling bearings 38, 40. At least one bearing 38 is mounted between an upstream end of the shaft 36 of the LP body and an inlet casing 42 located upstream of the LP compressor 14. Other bearings 40 are mounted between a downstream end of the shaft 36 of the LP body and an exhaust casing 44 located downstream of the LP turbine 22.

The fan 12 is driven by a fan shaft 46 which is driven by the LP shaft 36 by means of a reducer 48. This reducer 48 is generally of the planetary or epicyclic type.

The following description relates to a reducer of the epicyclic type, in which the planet carrier and the sun gear are rotatable, the ring gear of the reducer being stationary in the reference frame of the engine.

The reducer 48 is positioned in the upstream portion of the turbine engine. A stationary structure comprising schematically, here, an upstream portion 50a and a downstream portion 50b which makes up the engine casing or stator 50 is arranged so as to form an enclosure E surrounding the reducer 48. This enclosure E is closed upstream by a sealing 52 at the level of a bearing 54 through which the fan shaft 46 passes, and downstream by a sealing 55 at the level of a bearing 38 through which the LP shaft 36 passes.

The enclosure E is arranged inside the inlet casing 42, which is located between an inlet rectifier blading 56 and the LP compressor 14.

Figure 2:
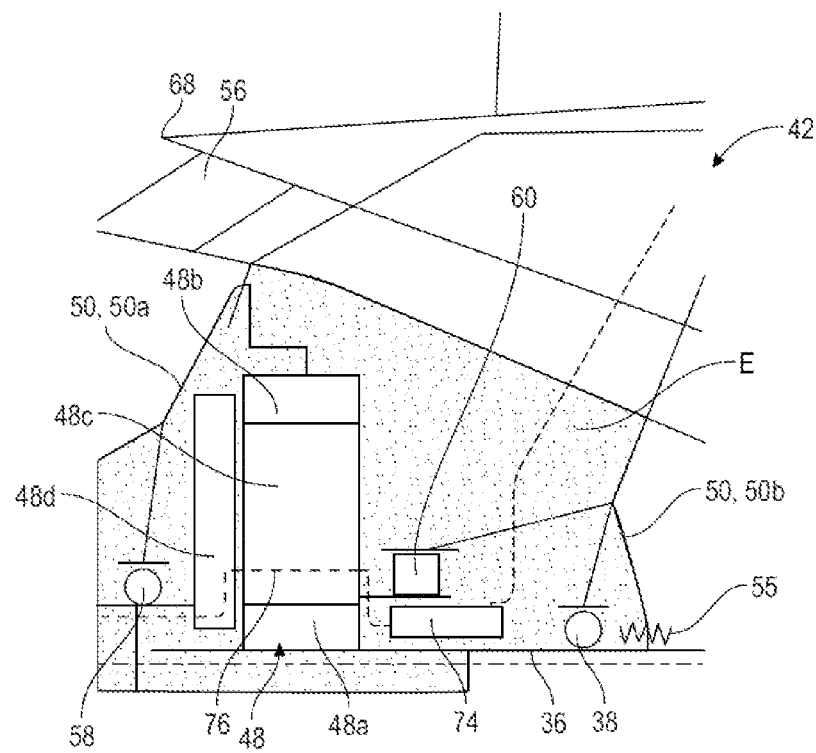
FIG. 2 is a larger scale view of a portion of FIG. 1.

FIG. 2 shows the reducer 48 on a larger scale.

The reducer 48 comprises a sun gear 48a centred on the axis A and coupled to the LP shaft 36 by means of splines, for example.

The reducer 48 comprises a ring gear 48b which is also centred on the axis A and attached to the inlet casing 42.

Finally, the reducer 48 comprises planet gears 48c arranged around the axis A and meshing with the sun gear 48a and the ring gear 48b. These planet gears 48c are carried by a planet carrier 48d which is movable in rotation about the axis A and is connected to the fan shaft 46 to drive it in rotation. The planet carrier 48d is guided by bearings 58, 60 carried by the inlet casing 42, these bearings 58, 60 being located respectively upstream and downstream of the reducer 48.

The fan 12 shown in FIG. 1 comprises variable pitch blades 12a and is associated with an actuator 62 which allows to control in a centralised manner the positioning of the blades 12a about their axes 3, which are generally radial axes relative to the axis A of the turbine engine.

Each of the blades 12a comprises a foot 12b forming a pivot which is housed in a housing of a hub 64 in the form of a polygonal annulus, and which is connected by a connection system 66 connecting to a piston of the actuator 62.

The actuator 62 extends along the axis A and its piston is translationally movable along this axis, for example from a first position in which the blades 12a are feathered to a second position in which the blades 12a obstruct the passage of air through the fan 12.

The airflow F1 which passes through the fan 12 is divided into two annular and coaxial flows downstream of the fan by an annular separator 68 which extends around the blading 56. A first air flow, referred to as the primary flow F2, flows in a primary duct passes through this blading 56 and flows into the compressors 14 and 16 to be compressed. This compressed air is then mixed with fuel and burnt in the combustion chamber 18. The combustion gases are then expanded in the turbines 20, 22 to drive their rotors and the LP 36 and HP 26 shafts, then flow into the nozzle 24.

A second air flow, referred to as the secondary flow F3, flows in a secondary duct which is defined internally by an annular engine casing 70 which extends longitudinally around the compressors 14, 16, the combustion chamber 18 and the turbines 20, 22, and outwardly by an annular nacelle casing 72 which extends longitudinally around the fan 12 and a portion of the engine. This nacelle casing 72 is connected to the engine by outlet guide vanes 42a of the inlet casing 42. These guide vanes 42a are structural and are configured to straighten the flow of air leaving the fan 12.

The actuator 62 is hydraulic and operates with a fluid, oil, which comes from a lubrication system located generally in the nacelle or between the compressors 14, 16 and the casing 70 (i.e. in the engine) and therefore in a stationary reference frame of the turbine engine. In contrast, the actuator 62 is located in a rotating reference frame.

As can be seen in FIG. 2, the turbine engine 10 comprises a device 74 for transferring oil from the stationary reference frame of the engine to the rotating frame in which the actuator 62 is located.

In the example shown, the device 74 is located downstream of the reducer 48 and preferably comprises several oil supply ways 76 to supply the actuator 62 and also to lubricate the reducer 48. The dotted line in FIG. 2 symbolises one of these ways along its entire path, from the stationary reference frame to the actuator 62: through the primary duct to the device 74, through the reducer 48 (between its planet gears or through the axles of these planet gears), and along the planet carrier and then the fan shaft 46.

Figure 3:
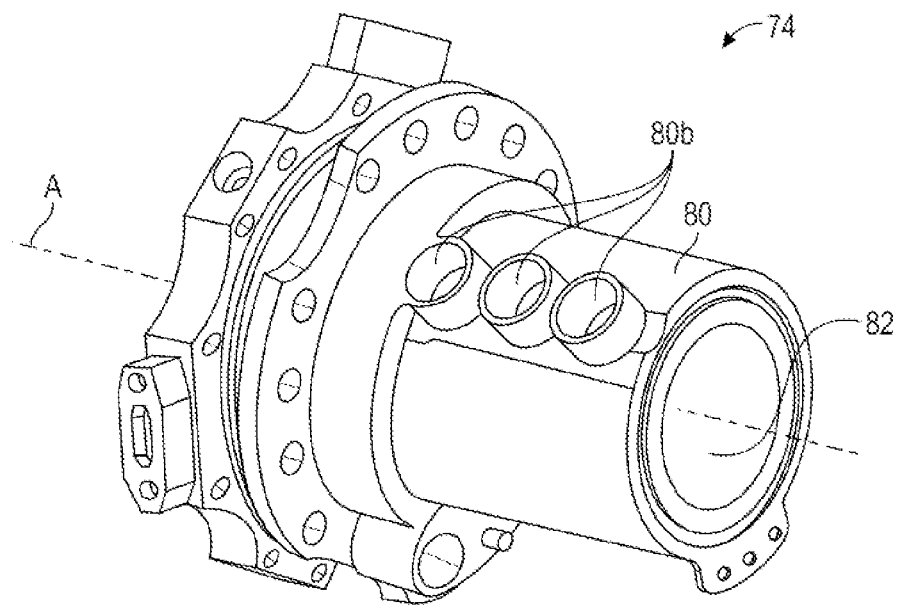
FIG. 3 is a schematic perspective view of an oil transfer device according to the prior art.
Figure 4:
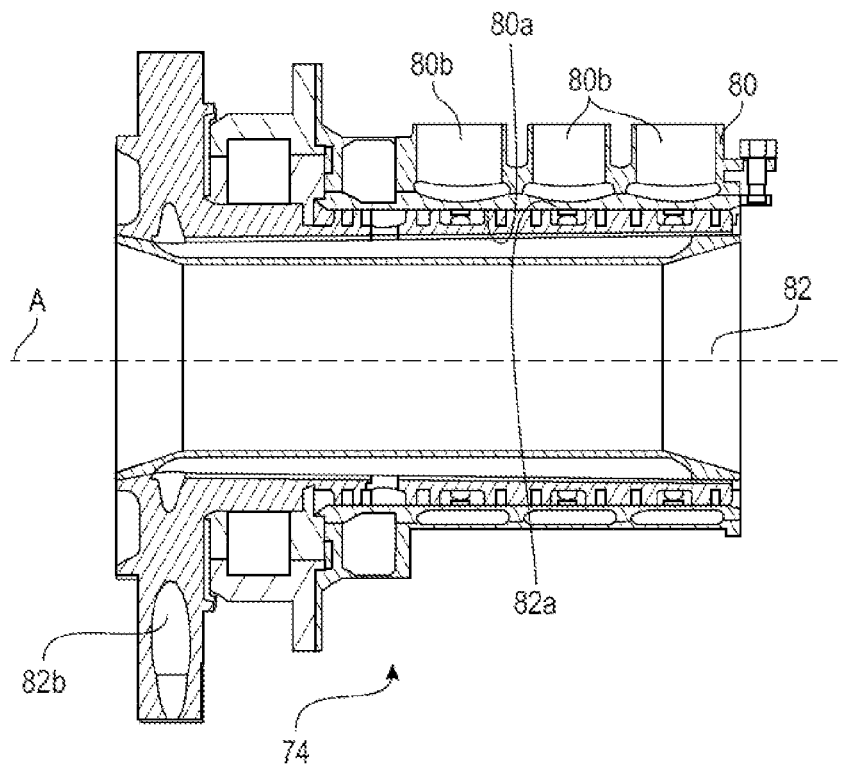
FIG. 4 is a schematic view of the device of FIG. 3 in axial cross-section.
Figure 5:
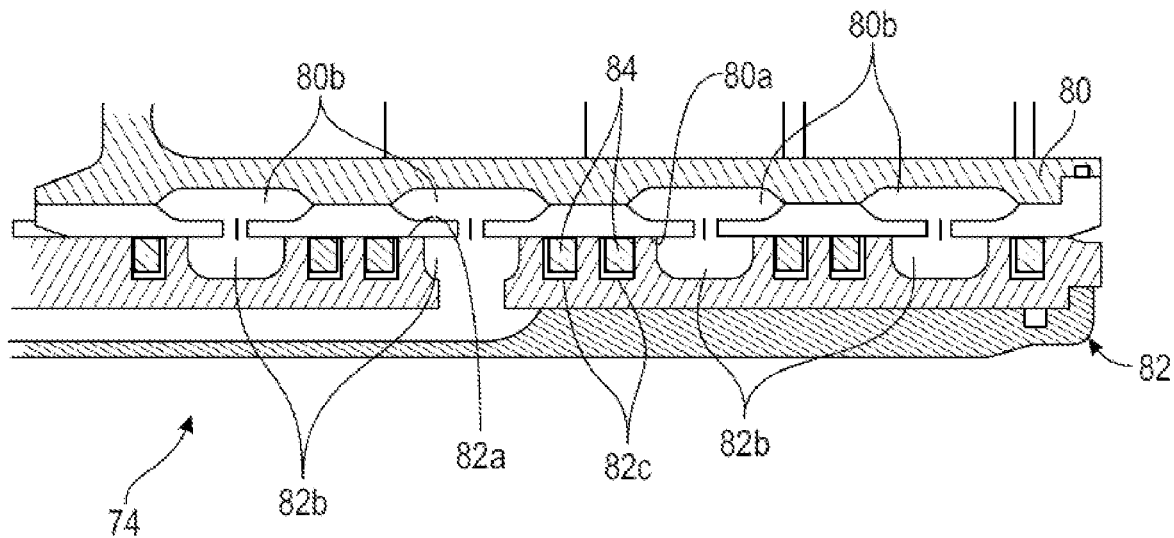
FIG. 5 is a larger scale view of a portion of FIG. 4.

FIGS. 3 to 5 illustrate an oil transfer device 74 using the technique prior to the present disclosure.

The device 74 comprises:
- a stator annulus 80 comprising an internal cylindrical surface 80a and internal oil pipes 80b each opening onto the internal cylindrical surface 80a,
- a shaft 82 engaged in the stator annulus 80 and movable in rotation about the axis A inside this annulus 80, the shaft 82 comprising an external cylindrical surface 82a extending inside the surface 80a, and internal oil pipes 82b which each open onto the surface 82a.

As can be seen in the enlarged view in FIG. 5, the surface 82a of the shaft 82 comprises annular grooves 82c for housing annular sealing segments 84. These segments 84 are able to displace in the grooves and are configured to rest radially on the internal surface 80a of the annulus 80 to limit and control the oil leaks. The outlets of the aforementioned pipes 80b, 82b are located between two adjacent segments 84 which therefore ensure that a maximum amount of oil supplied by each pipe 80b of the annulus 80 supplies the corresponding pipe 82b of the shaft 82.

This technology has a number of problems, as described above.

Figure 6:
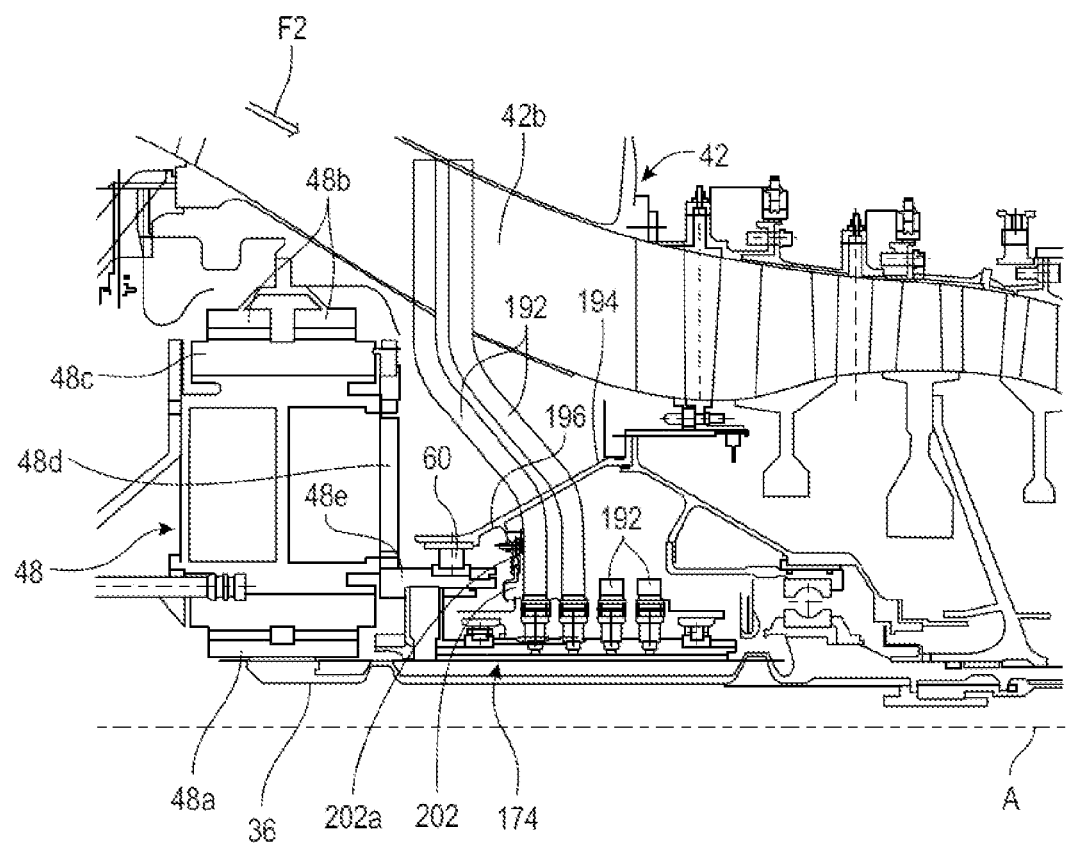
FIG. 6 is a schematic half-view in axial cross-section of a turbine engine equipped with an oil transfer device according to the disclosure.
Figure 7:
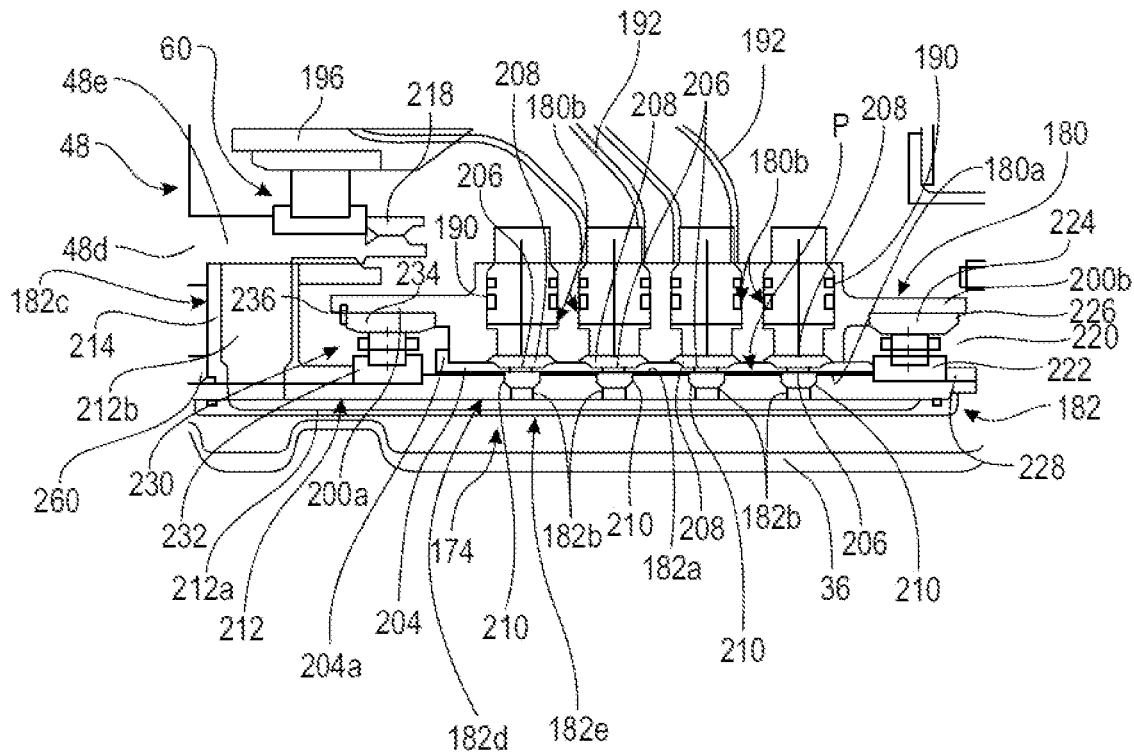
FIG. 7 is a larger scale view of a portion of FIG. 6.

The present disclosure remedies some or all of these problems by means of an oil transfer device, an embodiment of which is illustrated in FIGS. 6 and 7.

The reference numbers used in the foregoing to designate certain elements are used in the following description and in FIGS. 6 and 7 insofar as they designate these same elements.

The oil transfer device 174 according to the disclosure also comprises a stator annulus 180 and a shaft 182 engaged in the stator annulus 180 and movable in rotation about the axis A inside this annulus 180.

The annulus 180 comprises an internal cylindrical surface 180a and internal oil pipes 180b, each of which opens onto the surface 180a. The pipes 180b all have a radial orientation and are arranged one behind the other along the axis A. There are four of them in the example shown.

Although the pipes 180b are shown here in a same axial plane, they could be located in different axial planes. This depends in particular on the conduits 192 to which they are connected and the arms 42b through which these conduits pass. In yet another variant, the pipes 180b could comprise radially external ends located in a same axial plane and ends distributed angularly around the axis A and opening onto the surface 180a.

Each of the pipes 180b comprises a radially internal end which forms the aforementioned opening and a radially external end which forms a connecting port 190 for connecting to an oil conduit 192. The port 190 forms a female portion and one end of the conduit 192 forms a male portion engaged in a sealing manner in the port 190. Two of the conduits 192 connected to the annulus 180 are shown. These conduits 192 extend radially, firstly through openings 194 in an annular support 196 of the bearing 60, and secondly through tubular arms 42b of the inlet casing 42 which are located in the flowing duct of the primary flow F2. These conduits 192 then pass through the guide vanes 42a, which are located in the flowing duct of the secondary flow F3, to reach the lubrication system located in the nacelle. Alternatively, the lubrication system can be mounted in the engine (between the primary duct-compressors 14 and 16) and the casing 70 of the secondary duct, so that these conduits 192 do not pass through the secondary flow F3.

The annulus 180 is generally cylindrical in shape and comprises an upstream cylindrical rim 200a and a downstream cylindrical rim 200b. These rims 200a, 200b have identical or similar diameters.

As can be seen in FIG. 6, the annulus 180 can be connected by an axial retaining device to a stator and, for example, to bearing support 196. In the example shown, this device comprises a disc 202 located upstream of the annulus 180 and extending radially outwards. This disc 202 has its external periphery engaged in an annular plier 2020 carried by the bearing support 196. In operation, the disc 202 is able to slide in the circumferential direction inside the plier 202a and bears axially upstream and downstream on the two jaws of this plier 202a, located respectively upstream and downstream. FIG. 7 shows that a shrink ring 204 can be attached inside the annulus 180 so as to define its surface 180a. This shrink ring 204 extends over a major portion of the length of the annulus 180 and comprises a radially external annular rim 204a at its upstream end which bears axially against a cylindrical bearing surface of the annulus 180. As its name suggests, the shrink ring 204 is shrink-fitted into the annulus 180. The shrink-fit associated with the support of its rim 204a ensures that the shrink ring 204 is immobilised with respect to the annulus 180.

The shrink ring 204 comprises an annular row of radial orifices 206 in line with each of the pipes 180b. In addition, an annular gorge 208 is formed at the internal periphery of the annulus 180 and in line with each of the pipes 180b, this gorge 208 being closed on the inside by the shrink ring 204. It is therefore understood that each pipe 180b supply a gorge 208 and that each gorge 208 distributes oil to the orifices 206 of the shrink ring 204.

The shaft 182 comprises an external cylindrical surface 182a extending inside the surface 180a and internal oil pipes 182b each opening onto the surface 182a. The pipes 182b all have a radial orientation and are arranged one behind the other along the axis A. There are four of them in the example shown.

An annular gorge 210 is formed at the external periphery of the shaft 182 and in line with each of the pipes 182b.

Each of the pipes 182b is connected to a conduit 212 which can be integrated into the shaft 182. One of these conduits 212, visible in section in the figures, comprises an annular segment 212a which extends around the axis A and along a major portion of the length of the shaft 182. The downstream end of this segment 212a is connected to the downstream-most pipe 182b of the shaft, and its upstream end is connected to a radial segment 212b which is formed in an upstream annular rib 214 of the shaft.

This rib 214 is used for the attachment of the shaft 182 of the device 174. In the example shown, the shaft 182 of the device 174 is attached to the planet carrier 48d of the reducer 48. The planet carrier 48d comprises a downstream cylindrical rim 48e, on the external periphery of which the bearing 60 is mounted, and on the internal periphery of which the rib 214 engages. This rib 214 rests axially upstream on a cylindrical bearing surface of the rim 48e and is held in axial abutment against this bearing surface by a nut 216 screwed from downstream onto the internal periphery of the rim 48e.

The bearing 60 is a rolling bearing and comprises rollers which are arranged between two rings, an internal ring and an external ring respectively, the internal ring being clamped axially against another cylindrical bearing surface on the external periphery of the rim 48e by a nut 218 screwed onto this periphery from downstream.

A first rolling bearing 220 is mounted between the rim 200b of the annulus 180 and the downstream end of the shaft 182.

The bearing 220 is a rolling bearing and comprises rollers arranged between two rings, an internal ring 222 and an external ring 224. The external ring 224 is mounted, preferably clamped in the radial direction, inside the rim 200b and bears axially against a cylindrical bearing surface on the upstream internal periphery of the rim 200b. Downstream, the ring 224 is retained axially by an annular split strand 226 engaged in an annular groove in the internal periphery of the rim 200b.

The internal ring 222 is mounted, preferably clamped in the radial direction, on the downstream end of the shaft 182 and is axially supported on a cylindrical bearing surface of the shaft, located upstream. Downstream, the ring 222 is retained axially by a shrink ring 228 attached to the external periphery of the downstream end of the shaft 182. The rollers are preferably mounted radially clamped between the rings 222, 224.

A second rolling bearing 230 is mounted between the rim 200a of the annulus 180 and of the shaft 182.

The bearing 230 is a rolling bearing and comprises rollers arranged between two rings, an internal ring 232 and an external ring 234. The rollers are preferably mounted clamped radially between the rings 232, 234.

The external ring 234 is mounted, preferably clamped in the radial direction, inside the rim 200a and bears axially against a cylindrical bearing surface on the downstream internal periphery of the rim 200a. Upstream, the ring 232 is preferably clamped in the radial direction and retained axially by an annular split strand 236 engaged in an annular groove in the internal periphery of the rim 200a.

The internal ring 232 is mounted on a portion of the shaft 182 located between the rib 214 and the pipes 182b. This ring 232 rests axially on a cylindrical bearing surface of the shaft 182, located downstream. Upstream, the ring 232 is retained axially by an annular part 182c of the shaft which comprises the rib 214 and which is engaged on another part 182d of the shaft comprising the pipes 182b. The part 182c comprising the rib 214 is clamped axially against the internal ring 232 of the bearing 230 by a nut 260 screwed to the upstream end of the shaft 182 and in particular of the part 182d.

In the example shown, in addition to the parts 182c and 182d, the shaft 182 comprises another annular part 182e which extends along the entire length of the part 182d, inside the latter, and which defines the conduit 212 with this part 182d. The part 182e carries a seal at each of its axial ends, which is intended to cooperate with the internal periphery of the part 182d.

As the device 174 comprises two roller bearings 220, 230, there is no axial stop between the shaft 182 and the annulus 180 of the device. The disc 202 and the plier 202a described above ensure the axial retention of the annulus 180 on the axially corresponding shaft 182.

FIG. 6 allows to show that the shaft 182 extends around the LP shaft 36, the upstream end of which is coupled to the sun gear 48a of the reducer 48 by the aforementioned splines.

The LP shaft 36 thus forms the input shaft of the reducer 48. This shaft 36 has a diameter of between 30 mm and 200 mm, and preferably between 100 and 150 mm. It is configured to rotate at a peripheral speed of between 1 and 20 m/s, and preferably between 7 and 15 m/s.

According to a characteristic of the disclosure, the surfaces 180a, 182a defined in the example shown by the shrink ring 204, on the one hand, and by the shaft 182, on the other hand, are spaced apart by a radial thickness of between 10 and 30 μm. This space of controlled dimension allows the formation of a plain bearing P between the shaft 182 and the annulus 180, over substantially the entire longitudinal extent of the device 174. Advantageously, the device 174 has no sealing members, and in particular no sealing segments, in this area.

The plain bearing P is supplied with oil directly via the pipes 180b of the annulus 180. It is understood that the aforementioned radial thickness of the space is calculated so that controlled leakage takes place at the interfaces between the pipes 180b, 182b, so as to supply the plain bearing P. The oil then spreads over the entire axial extent of the plain bearing P and as far as the rolling bearings 220, 230 in order to lubricate them. The clamped mounting of these bearings 220, 230 allows to ensure the radial thickness of the space, without any risk of misalignment of the shaft 182 and of the annulus 180, and also limits the oil leakage outside the plain bearing P.

The leakage in a plain bearing is proportional to the diameter, the cube of the clearance and the square of the rotor/stator eccentricity (calculation of leakage in a hydrostatic seal with an annular cross-section). The diameter of the plain bearing is relatively large, and the operating pressure is also relatively high (e.g. 100-130 bar), so it is important to control the rotor/stator clearance and the eccentricity of the rotor during operation.

The orifices 206 of the shrink ring 204 are located at an axial distance from each other and/or the gorges 210 of the shaft 182 are located at an axial distance from each other of between 15 and 35 mm.

The rolling bearings 220, 230 preferably have identical mean diameters. They are preferably identical.

The average diameters of the bearings 220, 230 are preferably greater than the diameter of the bearing P.

By "way" of the device 174 is meant the association of a pipe 180b of the annulus 180 with a pipe 182b of the shaft 182. In the example shown, the device 174 comprises four ways. Preferably, one of the ways is used to lubricate the reducer 48, and in particular at least some of its bearings and toothing. One of the ways is used to supply oil to the actuator 62, and another of the ways is used to return oil from the actuator 62. Finally, the last ways can be used for the hydraulic protection of the actuator.

The conduits 212 connected to the ways of the actuator can pass through the planet carrier 48d of the reducer 48. Insofar as the shaft 182 of the device 174 and the conduits 212 are in the rotating reference frame with the planet carrier 48d, the passage of these conduits 212 through the planet carrier 48d does not pose a problem.

The device 174 is configured, for example, to supply the actuator 62 at an oil pressure of between 2 and 200 bar, and preferably between 5 and 130 bar, and to supply the reducer 48 at an oil pressure of between 2 and 50 bar, and preferably between 5 and 20 bar.

Figure 8:
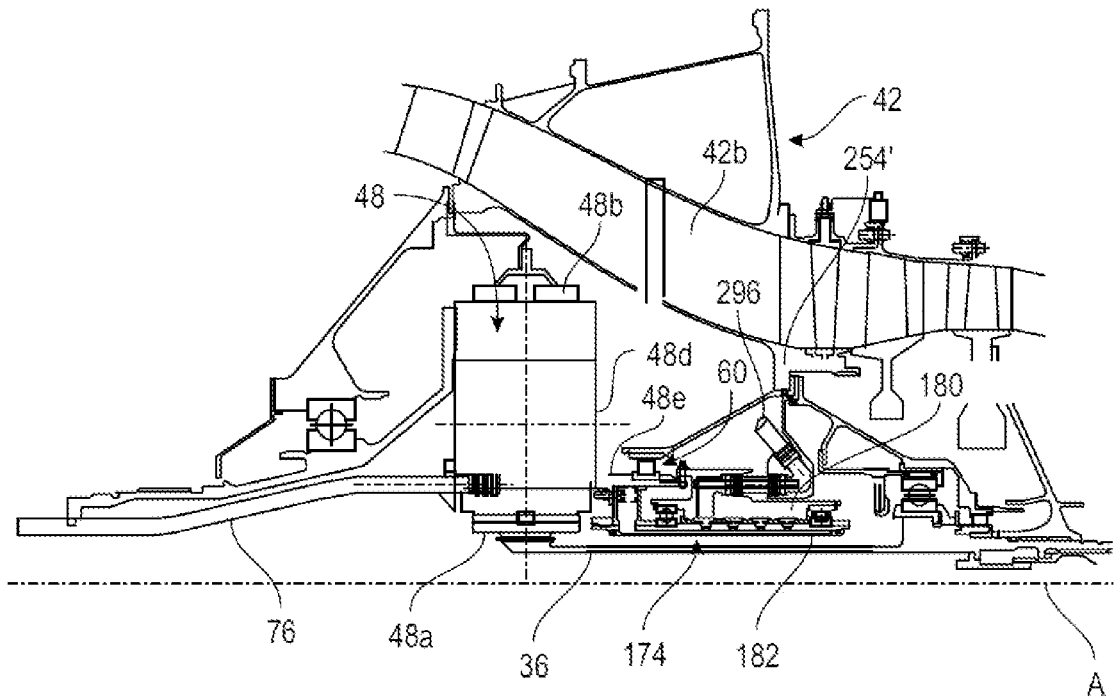
FIG. 8 is a schematic half-view in axial cross-section of a turbine engine equipped with a variant of embodiment of an oil transfer device according to the disclosure.
Figure 9:
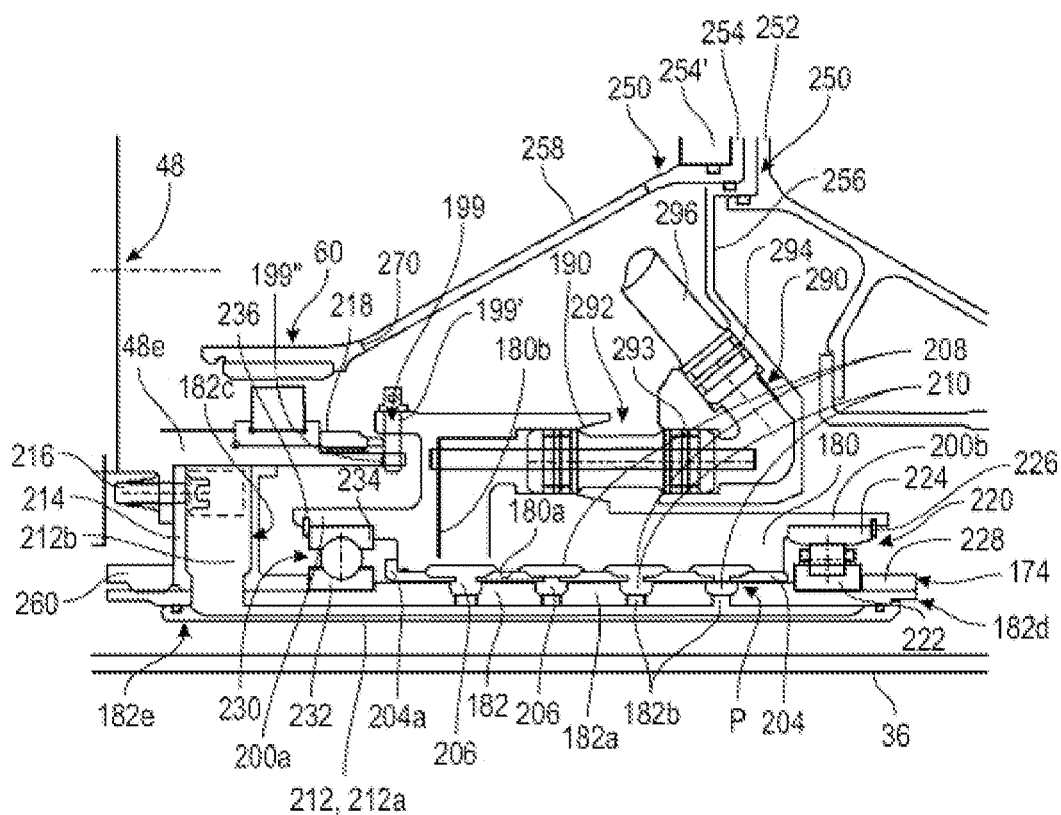
FIG. 9 is a larger-scale view of the device shown in FIG. 8.

FIGS. 8 and 9 illustrate an alternative embodiment of an oil transfer device 174 in accordance with the disclosure.

The device 174 comprises the characteristic described in the foregoing with the exception of those which are inconsistent with FIGS. 8 and 9 and the following.

The stator annulus 180 comprises internal oil pipes 180b, each of which comprises a radially internal end opening onto the surface 180a and a radially external end which forms a first port 190 for connection to an oil supply socket 292.

The port 190 forms a female portion and one end of the socket 292 forms a male portion engaged in a sealing manner in the port 190.

The port 190 and the socket 292 have an axial orientation, so the socket 292 and the port 190 are engaged by axial translation.

One of the sockets 292 connected to the annulus 180 is shown in FIG. 9. For example, the number of sockets 292 is equal to the number of pipes 180b.

The sockets 292 have their axial ends opposite the ports 190 axially engaged in second ports of an annular support 250, as will be described in more detail below.

In the example shown, the sockets 292 are of the "dog bone" type, i.e. they are generally shaped like dog bones. They each have an elongated shape with enlarged longitudinal ends, which here carry O-ring seals that cooperate with the ports 190.

The annulus 180 comprises an orifice 199' for mounting a temporary pin 199 for immobilising in rotation the annulus 180 on the shaft 182. This pin 199 is configured to be engaged in a recess 199" of the aforementioned rim 48e of the turbine engine when the device 174 is mounted and then to be withdrawn after this mounting. In the example shown, the orifice 199' has a substantially radial orientation and is formed at the external periphery of the annulus 180. The recess 199" is formed by a notch formed on the free downstream edge of the rim 48e.

The pin 199 comprises a cylindrical body oriented radially in the mounting position and connected to a head comprising a through attachment orifice for attaching one end of a cable (not shown). This cable is used by an operator to pull the pin 199, disengage it from the orifice 199' and from the recess 199' and remove it from the turbine engine. The head is connected to the radially external end of the body when the pin 199 is in the mounted position.

The annular support 250 extends at least partly around the annulus 180 and carries the sockets 292 for fluidic connection to the pipes 180b of the annulus 180. The support 250 comprises a number of annular walls and attachment members for attaching to the casing 42, which in the example shown are formed by annular flanges 252, 254.

The support 250 is preferably configured to deform elastically so as to allow the bearing 60 to displace in a radial direction. This support 250 is independent of the annulus 180 in that they are not rigidly attached to each other.

In the example shown, the support 250 comprises frustoconical walls 256, 258, at least one of which may be perforated, i.e. may comprise through apertures, so as to reduce its rigidity in the radial direction. This rigidity can also be reduced by reducing the thickness of this wall.

A first frustoconical wall 256 of the support 250 extends substantially radially and is connected at its external periphery to the attachment flange 252 for attaching to the casing 42. At its internal periphery, this wall 256 comprises integral pipes 290 comprising ports 293, 294 at each of its ends.

The number of pipes 290 is equal to the number of pipes 180b in the annulus 180. Only one of these pipes 290 is visible in FIGS. 8 and 9. Each of the pipes 290 has an angled shape, one radially internal end of which is connected to the port 293 which extends axially upstream opposite one of the aforementioned ports 190, in order to receive by male-female engagement one end of a socket 292 engaged in this port 190. The radially external end of each pipe 290 is connected to the port 294 which extends radially upstream and outwards to receive by male-female engagement the radially internal end of an oil supply conduit 296.

The support 250 comprises a second frustoconical wall 258 which extends radially outwards from upstream to downstream. This second wall 258 comprises at its external periphery the attachment flange 254 for attaching to the casing 42. The flange 254' of the casing 42, which is attached to the flanges 252, 254, extends in a plane perpendicular to the axis A, which passes between the bearings 220, 230.

The internal periphery of the wall 258 is located upstream of the annulus 180 and carries the external ring of the aforementioned bearing 60 in the example shown.

As mentioned above, the support 250 and in particular its wall 258 comprises openings 270 for the passage of the oil supply conduits 296.

Each of the pipes 296 extends radially, firstly through the openings 270, and secondly through tubular arms 42b of the inlet casing 42 which are located in the flowing duct of the primary flow F2. These pipes 296 then pass through the guide vanes 42a, which are located in the flowing duct of the secondary flow F3, to reach the lubrication system located in the nacelle (see FIG. 1). Alternatively, the lubrication system can be mounted in the engine (between the primary duct-compressors 14 and 16) and the casing 70 of the secondary duct, so that these conduits 192 do not pass through the secondary flow F3.

The disclosure further proposes a method for assembling the device 174, comprising the steps of:
   a) mounting the annulus 180 on the shaft 182 of the device 174,
   b) attaching the shaft 182 of the device 174 to the planet carrier 48d of the reducer 48, and
   c) displacing in translation the reducer 48 and the device 174 towards the stator.

The device 174 then takes the form of a pre-assembled cartridge. The annulus 180 is slave-mounted on the shaft 182, which allows to control and guarantee the clearance of the plain bearing P.

The invention claimed is:

1. A fan module for an aircraft turbine engine, the fan module comprising a fan that comprises a fan shaft and variable pitch fan blades, and an oil transfer device that is configured to ensure a transfer of oil between a stator and an actuator, the actuator being secured in rotation to the fan shaft and being configured to control the pitch of the fan blades, the oil transfer device comprising:
   a stator annulus comprising an internal cylindrical surface and first internal oil pipes, each of the first internal oil pipes opening onto said internal cylindrical surface, and
   a shaft engaged in said stator annulus and movable in rotation about an axis inside the stator annulus, the shaft comprising an external cylindrical surface extending inside said internal cylindrical surface, the shaft comprising second internal oil pipes each of which opens onto said external cylindrical surface,
   wherein an annular space is defined between said internal cylindrical surface and external cylindrical surface, the annular space having a radial thickness of between 10 and 30 µm for the formation of a plain bearing, the plain bearing extending over the entire axial extent of the internal cylindrical surface and external cylindrical surface and being devoid of sealing members,
   and wherein two rolling bearings are mounted between the stator annulus and the shaft on each side of the plain bearing, each rolling bearing comprising internal and external rings between which rolling elements are located, each rolling bearing being mounted clamped in the radial direction between the stator annulus and the shaft.

2. The fan module according to claim 1, wherein the rolling elements of each of the rolling bearings are rollers.

3. The fan module according to claim 1, wherein the stator annulus comprises at least three of said first internal oil pipes aligned one behind the other along said axis, and the shaft comprises at least three of said second internal oil pipes aligned one behind the other along said axis.

4. The fan module according to claim 1, wherein each of the first internal oil pipes opens into a first annular groove located on said internal cylindrical surface, and each of the second internal oil pipes opens into a second annular groove located on said external cylindrical surface.

5. The fan module according to claim 4, wherein said first annular grooves are located at an axial distance from each other of between 15 and 35 mm, and said second annular grooves are located at an axial distance from each other of between 15 and 35 mm.

6. The fan module according to claim 4, wherein internal rings of the rolling bearings have identical internal diameters, and the external rings of the rolling bearings have identical internal diameters.

7. The fan module according to claim 1, wherein a shrink ring is mounted inside the stator annulus and defines said internal cylindrical surface.

8. The fan module according to claim 1, wherein the rolling bearings have identical mean diameters.

9. The fan module according to claim 1, wherein the rolling bearings have average diameters greater than the diameter of the plain bearing.

10. The fan module according to claim 1, wherein the fan is driven in rotation by a reducer, said oil transfer device being mounted downstream of the reducer and being configured to supply said oil to the reducer and to the actuator by conduits passing through the reducer.

11. A method for assembling the module according to claim 10, the method comprising the steps of:
   a) mounting the stator annulus on the shaft of the oil transfer device,
   b) attaching the shaft of the oil transfer device to a planet carrier of the reducer, and
   c) displacing in translation the reducer and the oil transfer device towards the stator.

\* \* \* \* \*